2,478,560

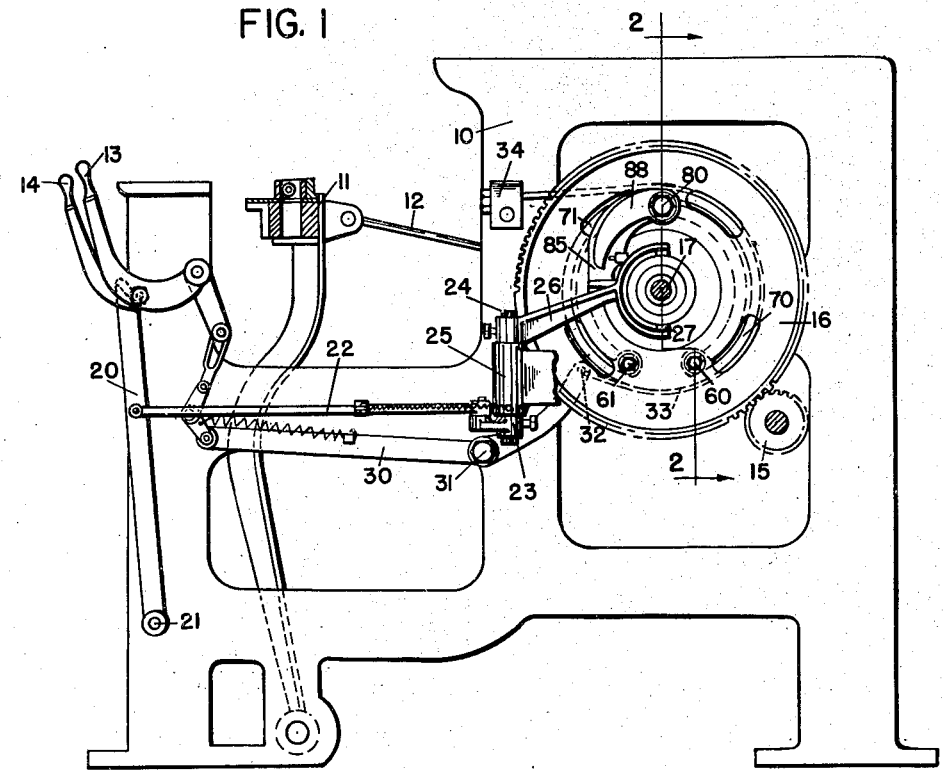

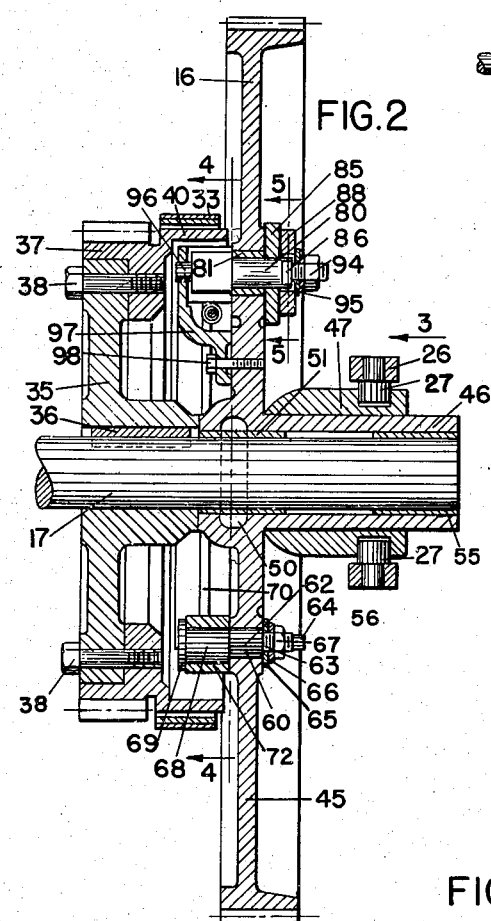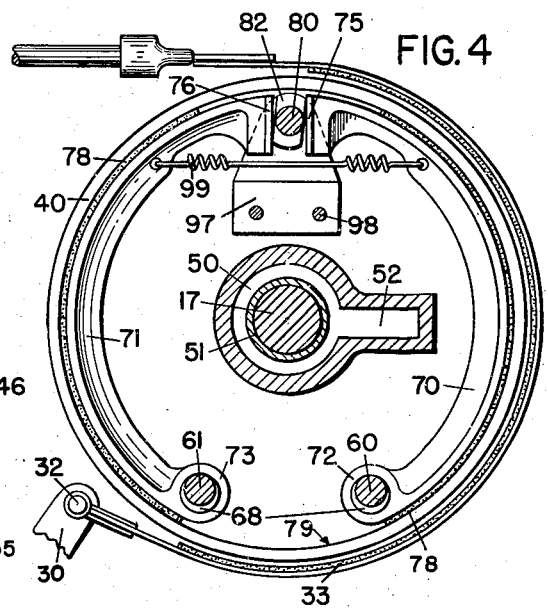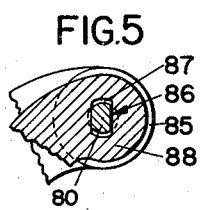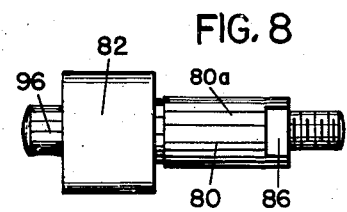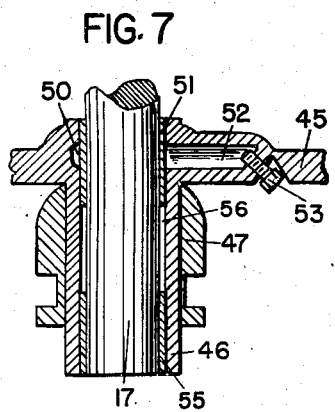
Aug. 9, 1949.   C. P. BERGSTROM ET AL   2,478,560
CAM OPERATED TRANSVERSELY ENGAGED CLUTCH FOR LOOMS
Filed Nov. 29, 1945   2 Sheets-Sheet 2
INVENTORS
CARL P. BERGSTROM
and ALBERT PALMER
ATTORNEY Patented Aug. 9, 1949

UNITED STATES PATENT OFFICE 2,478,560

CAM OPERATED TRANSVERSELY ENGAGED CLUTCH FOR LOOMS

Carl P. Bergstrom and Albert Palmer, Worcester, Mass., assignors to Crompton & Knowles Loom Works, Worcester, Mass., a corporation of Massachusetts Application November 29, 1945, Serial No. 631,653

6 Claims. (Cl. 192—93)

1

This invention relates to improvements in clutches for looms and it is the general object of the invention to provide a clutch which is readily adjustable to compensate for wear.

Looms are ordinarily driven by an electric motor the pinion of which meshes with a large gear loose on the top of the crank shaft of the loom. A second gear keyed to the top shaft meshes with another gear on the bottom shaft so that all parts operated by the two shafts will be synchronized and derive power from the motor. As heretofore made compensation for wear and also lubrication of the clutch mechanism for connecting the large loose gear to the keyed gear has been difficult. It is an important object of our present invention to provide a clutch having shoes mounted on eccentrics so that their position with respect to the loose gear can be adjusted from readily accessible points.

It is another object of our present invention to have the shipper mechanism so constructed as to rock a non-circular member for the purpose of spreading the clutch shoes and to construct this spreading member in such manner that movement of the shoes by the eccentrics will not materially affect the setting of the shoes with respect to the non-circular spreading member.

One objection which has been raised against clutches heretofore used in looms is the fact that they throw oil which gets on the fabric being woven. It is a further object of our present invention to provide improved means for lubricating the large loose gear bearing in such manner that escape of oil is eliminated without sacrifice of lubrication sufficiency.

With these and other objects in view which will appear as the description proceeds, our invention resides in the combination and arrangement of parts hereinafter described and set forth.

In the accompanying drawings, wherein a convenient embodiment of our invention is set forth, Fig. 1 is a side elevation of part of a loom having our improved clutch applied thereto, Fig. 2 is an enlarged vertical section on line 2—2 of Fig. 1, Fig. 3 is a reduced side elevation partly in section looking in the direction of arrow 3, Fig. 2, Figs. 4 and 5 are detailed vertical sections on lines 4—4 and 5—5, respectively, of Fig. 2, Fig. 6 is a plan view looking in the direction of arrow 6, Fig. 3, and showing the conical sliding member by which the clutch is moved into and out of operating position, Fig. 7 is a horizontal section on line 7—7, Fig. 3, and

2

Fig. 8 is an enlarged elevation of the shoe spreading member, shown in the upper part of Fig. 2.

Referring particularly to Fig. 1, the loom frame 10, lay 11, lay connector 12 and shipper and brake handles 13 and 14, respectively, may be of usual construction. The loom is provided with a motor not shown but having a pinion 15 which meshes with a large gear 16 loosely mounted on the top shaft 17 by means of which the lay 11 is reciprocated through the connector 12.

The shipper handle 13 cooperates with a shipper lever 20 pivoted to the loom frame at 21 and provided with a rearwardly extending rod 22 connected to an arm 23 secured to a vertical stud 24 rotatably mounted in a fixed stand 25. An arm 26 secured to the upper part of stud 24 is yoked as indicated in Fig. 1 and is provided with a pair of operating pins 27. When the shipper handle is pulled forwardly or to the left as viewed in Fig. 1 the arm 26 will be moved to the left as viewed in Fig. 2.

The brake handle 14 is connected to a brake lever 30 pivoted at 31 to the loom frame and having the rear end thereof connected as at 32 to a brake band 33, the upper end of which is anchored as at 34 in fixed position with respect to the loom frame, see Fig. 1. When the handle 14 is in the off position or in its left hand position as shown in Fig. 1 the brake band will be loose with respect to driving mechanism to be described, but when the brake handle 14 is moved to the right as viewed in Fig. 1 the brake band moves to braking position.

Except as noted hereinafter the matter thus far described is of common construction in looms.

Referring particularly to Figs. 2, 3 and 4, we have shown a gear spider 35 keyed as at 36 to shaft 17 and having a ring gear 37 bolted thereto as at 38. The ring gear constitutes the upper or crank shaft gear of the loom and will ordinarily mesh with another gear not shown below it and on the bottom shaft not shown of the loom.

Integral with the ring gear is a cylindrical drum 40 around which the brake strap 33 extends. The motor driven loose gear 16 has a web 45 from which extends a hub 46 on which is slidably mounted a clutch setting sleeve member 47 the left end of which is tapered as indicated in Fig. 2. Member 47 is controlled by the shipper handle operated lever 26 and is moved along hub 46 toward and from the web 45.

The hub 46 is provided with a circumferential recess 50 which is sealed by a bearing sleeve 51 driven into the hub 46 and surrounding the shaft 17. The sleeve 51 is made of porous bearing material, preferably metallic, through which oil leaks very slowly to lubricate the sleeve with respect to the shaft. The recess 50 communicates with an oil chamber 52 extending along the web 45 and closed by a plug or screw 53, see Fig. 7. When it is desired to provide the recess 50 with oil the plug 53 is removed and oil is introduced into the chamber 52 and from the latter moves into the groove or cavity 50 and thence penetrates the bearing sleeve 51. After the plug 53 is fastened in place the oiling system is completely inclosed and there is no opportunity for oil to splash on the fabric being woven. A second bearing sleeve 55 driven into hub 46 supports the outer end of the latter on shaft 17. Sleeve 55 is spaced from sleeve 51 and with it defines a zone 56, see Fig. 7, into which oil oozes from shell 51 and thence to shell 55.

The web 45 has secured thereto for rotary adjustment two eccentrics 60 and 61 which are both alike and a description of one of them will suffice for both. Eccentric 60 has a bearing 62 rotatable in the web 45, see Fig. 2, and has a threaded end 63 terminating in a non-circular head 64. Lock washers 65 and 66 and lock nut 67 provide means for holding the eccentric 60 in any adjusted position to which it may be moved by means of the non-circular head 64.

Extending to the left of the bearing 62 is an eccentric bearing 68 the axis of which is displaced with respect to the axis of bearing 62. A head 69 formed on the eccentric bearing 68 is of larger diameter than the latter for a reason to be set forth.

The clutch is provided with shoes 70 and 71 mounted, respectively, on the eccentrics 60 and 61. These shoes are similar to each other, shoe 70 having a hub 72 on the eccentric bearing of eccentric 60 and shoe 71 similarly having a hub 73 for eccentric 61. Hubs 72 and 73 are located between web 45 and heads 69 of the eccentrics. The shoes 70 and 71 are of arcuate form as shown more particularly in Fig. 4, and extend upwardly from their respective eccentrics and are provided with vertical wear plates 75 and 76, respectively. These wear plates are substantially parallel to each other and will ordinarily be equally spaced from a diameter passing through the axis of shaft 17 and midway between the eccentrics. Each shoe 70 and 71 is provided with a lining 78 which engages an inner cylindrical surface 79 of the drum 40.

As shown in the upper part of Figs. 2 and 4 the means for spreading the clutch shoes 70 and 71 comprises a stud member 80 rotatable in a sleeve 81 driven into the web 45. The left end of this stud has a non-circular block or head 82 which lies between the wear plates 75 and 76, see Fig. 4, and preferably has parallel sides for engaging the plates.

The cylindrical part 80ª of stud 80, rotatable in sleeve 81, extends through and acts as the pivot for an operating lever 85. To the right of lever 85 the stud 80 is slabbed as at 86, see Figs. 2 and 8, and fits into a similarly formed hole 87 in setting arm 88. The latter as shown in Fig. 3 extends to the left and downwardly and is in position for engagement with an adjustable operating screw 90 carried by a lug 91 on lever 85.

Lever 85 has bifurcations 92 between which is rotatably mounted a roll 93 for engagement with the conical sliding setting member 47. A holding nut 94 and lock washer 95 hold arm 88 on the slabbed part 86 of stud 80, and lever 85 is freely rotatable between arm 88 and web 45. Head 82 is large enough to engage sleeve 81 and limit movement of stud 80 to the right as viewed in Fig. 2.

The left end of stud 80 is reduced as at 96 and fits into an end bearing member 97 secured as at 98 to the web 45 of gear 16. This bearing member 97 cooperates with the sleeve bearing 81 to hold the stud 80 in proper position with respect to the large gear 16 and for rotation on its axis.

When the clutch linings 78 are new, the eccentrics 60 and 61 will be set so that the hubs 72 and 73 will be at their greatest distances from the drum 40. When the shipper handle is in stopping position the head 82 of stud 80 will have its sides parallel to and in engagement with the wear plates 75 and 76 so that a spring 99 connecting the clutch shoes will draw the latter away from the drum 40. Under these conditions the shoes 78 will be spaced from the drum several thousandths of an inch and large gear 16 can turn without driving shaft 17 and the loom. When the shipper handle is pulled on to running position slide member 47 will move toward web 45 and push roll 93 outwardly to rock operating lever 85, thus causing screw 90 to rock setting arm 88 to the left as viewed in Fig. 3. Block 82 will then be rocked to the position shown in Fig. 4, thereby separating the shoes of the clutch and causing them to engage the drum 40 to transmit power from the gear 16 to the ring gear 37 and the shaft 17.

When the shoe linings 78 become worn the nuts 67 will be loosened and the eccentrics turned the proper amount by means of a suitable tool such as a wrench applied to the slabbed ends 64 of the eccentric studs. In order that the setting of the shoes may be gauged the web 45 is provided with several arcuate openings 100 concentric with gear 16 and so disposed as to expose parts of the clutch shoes near their ends. When the shoes have been given their correct new setting the nuts 67 can be tightened.

When the eccentrics are adjusted there will be a slight motion of the shoe as a whole toward and from the stud 80. This motion will not materially affect the setting of the clutch by the shipper handle inasmuch as the wear plates 75 and 76 are parallel to a line passing through the stud 80 and shaft 17 and midway between the eccentrics 60 and 61. Because of this relationship it is not necessary to adjust the stud 80 when the eccentrics are adjusted.

From the foregoing it will be seen that we have provided a simple and efficient form of clutch wherein the clutch shoes are mounted on adjustable eccentrics and wherein the shoes are separated by a spreading means such as block 82 on the stud 80. This stud and the wear plates 75 and 76 are so related to the eccentrics that adjustments of the latter can be made without requiring adjustments of the stud 80 or its connections to the shipper mechanism. It will further be seen that the drum 40 serves the double purpose of cooperating with the brake band 33 and also the clutch shoes. The shipper and brake handles and the mechanisms connected to them are ordinarily set in such a manner that the brake is not applied until the driving force between the motor and the loom has been disconnected at the clutch. It occasionally happens however that these two sets of mechanism will not be exactly timed and the brake may go on before the clutch is entirely free. If this should happen it will be apparent particularly from Fig. 2 that there will be no twisting of the parts of the driving mechanism because of the fact that the brake band and clutch shoes operate in substantially the same plane and both act on the drum 40. Adjustment of the shoes is facilitated by the openings 100 in the web 45, and these openings are located adjacent to the ends of the clutch shoes. Furthermore, the bearing sleeve 51 which is driven into the hub 46 provides a tight seal for the oil in the peripheral groove or recess 50 and the oil chamber 52. Also, the shoe controlling stud 80 is supported on both sides of the block 82, one of these supports being the sleeve 81 and the other being the bearing 97. The spring 99 as shown in Fig. 2 applies its force at points intermediate the ends of the block 82, and the bearing 97 is so made as to permit the spring to occupy a position wherein this advantage exists.

Having thus described our invention it will be seen that changes and modifications may be made therein by those skilled in the art without departing from the spirit and scope of the invention and we do not wish to be limited to the details herein disclosed, but what we claim is:

1. In clutch mechanism for a loom shaft having a drum secured thereto, a driving gear loose on the shaft, clutch shoes pivotally mounted on the gear and movable relatively to the latter in a direction to engage the drum, a spreading member mounted on the gear for angular movement relatively thereto, a block forming part of said spreading member located between said shoes and effective when said member is turned in a given direction to move said shoes into engagement with the drum, said member having a journal beyond the block with respect to the gear, and a bearing for said journal secured to said gear at a point between said shoes.

2. In clutch mechanism for a loom having a shaft within a drum secured thereto, a driving gear loosely mounted on the shaft, a pair of clutch shoes pivoted to said gear and movable relatively to the latter into engagement with the drum, a spreading member rotatably mounted on the gear, a bearing secured to the gear and having a part thereof on one side of said shoes, a gudgeon on said member turnable in said bearing, a non-circular block forming part of said member located between the gear and said bearing and also between said shoes and effective when said member is turned in a given direction to move said shoes into engagement with the drum.

3. In clutch mechanism for a loom shaft having a drum secured thereto, a driving gear loosely mounted on the shaft and having a web, a pair of clutch shoes pivoted to said web and located on opposite sides of the shaft, a spreading member rotatably mounted on the web and having a gudgeon on one end thereof spaced from the web, a bearing for said gudgeon mounted on the web, a non-circular block forming part of said member located between said shoes and between said bearing and said web, and means on that side of the web opposite said bearing to turn said member relatively to the web in a direction to cause said block to move the shoes into engagement with said drum.

4. In clutch mechanism for a loom shaft having a drum secured thereto, a gear loosely mounted on the shaft and having a web, a pair of arcuate clutch shoes for the drum each having one end thereof pivoted with respect to the web, a spreading member for said shoes rotatably mounted on the web and having a gudgeon on one end thereof, a bearing secured to the web and having a part thereof receiving said gudgeon and spaced from said web, the other ends of said shoes being located between said bearing and said web, and a non-circular block forming part of said spreading member located between said bearing and said web and also between said other ends of the shoes to move the latter into engagement with the drum.

5. In clutch mechanism for a loom shaft having a drum secured thereto, a gear loosely mounted on the shaft and having a web, a pair of arcuate clutch shoes for the drum each having one end thereof pivoted with respect to the web, a spreading member for said shoes rotatably mounted on the web and having a gudgeon on one end thereof, a bearing secured to the web and having a part thereof receiving said gudgeon and spaced from said web, the other ends of said shoes being located between said bearing and said web, a non-circular block forming part of said spreading member located between said bearing and said web and also between said other ends of the shoes to move the latter into engagement with the drum, and spring means connecting said shoes together and effective to hold them against said block, said springs passing between the web and said part of the bearing.

6. A gear for a loom driving clutch, a pair of arcuate clutch shoes supported on the gear, a spreader member for the shoes, said gear having peripheral gear teeth and a web, a hub extending laterally from the web, a pair of eccentric studs secured to the web for the shoes on one side of the hub, a bearing in the web for the spreader member located on the opposite side of the hub, and the web having arcuate slots therein extending between said bearing and said eccentric studs and located to expose the shoes from that side of the web opposite the shoes when the latter are on said studs.

CARL P. BERGSTROM.
ALBERT PALMER.

REFERENCES CITED

The following references are of record in the file of this patent:

UNITED STATES PATENTS

| Number | Name | Date |
| --- | --- | --- |
| 313,644 | Bartron | Mar. 10, 1885 |
| 1,039,595 | Savage | Sept. 24, 1912 |
| 1,666,368 | Cook | Apr. 17, 1928 |
| 1,816,758 | Adams | July 28, 1931 |
| 2,181,721 | Boldt | Nov. 28, 1939 |
| 2,251,862 | Wilson | Aug. 5, 1941 |

FOREIGN PATENTS

| Number | Country | Date |
| --- | --- | --- |
| 12,704 | Great Britain | June 3, 1903 |